(12) United States Patent
Ueda et al.

(10) Patent No.: US 7,736,815 B2
(45) Date of Patent: Jun. 15, 2010

(54) METHOD OF OPERATING A FUEL CELL SYSTEM BY DETECTING LEAKAGE OF A COMBUSTIBLE GAS

(75) Inventors: Tetsuya Ueda, Kasugai (JP); Shinji Miyauchi, Nara (JP); Akinari Nakamura, Katano (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/489,549

(22) Filed: Jun. 23, 2009

(65) Prior Publication Data

US 2009/0263686 A1    Oct. 22, 2009

Related U.S. Application Data

(63) Continuation of application No. 10/955,516, filed on Sep. 30, 2004.

(30) Foreign Application Priority Data

Oct. 1, 2003    (JP) ............... 2003-343414

(51) Int. Cl.
  *H01M 8/00*    (2006.01)
  *H01M 8/04*    (2006.01)
(52) U.S. Cl. .................. 429/444; 429/428
(58) Field of Classification Search .......... 429/19, 429/12, 34, 17; 356/437; 73/1.01
  See application file for complete search history.

(56) References Cited

U.S. PATENT DOCUMENTS

| | | | |
|---|---|---|---|
| 4,489,590 A * | 12/1984 | Hadden | 73/1.04 |
| 6,103,411 A | 8/2000 | Matsubayashi et al. | |
| 6,682,841 B1 | 1/2004 | Armstrong et al. | |
| 6,687,005 B2 * | 2/2004 | Kim | 356/437 |
| 7,090,943 B2 | 8/2006 | Meredith et al. | |
| 2002/0127446 A1 * | 9/2002 | Ueda et al. | 429/19 |
| 2003/0082417 A1 * | 5/2003 | Lillis | 429/12 |
| 2003/0104711 A1 * | 6/2003 | Nakamura et al. | 439/19 |

FOREIGN PATENT DOCUMENTS

JP    03-254070 A    11/1991

* cited by examiner

*Primary Examiner*—Dah-Wei D Yuan
*Assistant Examiner*—Zachary Best
(74) *Attorney, Agent, or Firm*—Panitch Schwarze Belisario & Nadel LLP (57) ABSTRACT

A method of operating a fuel cell system includes step a) of providing a package accommodating a fuel cell stack and a hydrogen-rich gas supply configured to supply hydrogen-rich gas, step b) of detecting leakage of a combustible gas, comprised of the hydrogen-rich gas or a raw fuel gas, using a combustible gas detector, step c) of injecting the combustible gas intermittently into the package through a combustible gas guide pipe, and step d) of determining whether or not detection sensitivity of the combustible gas is proper based on an output value of the combustible gas detector when step c) is preformed.

9 Claims, 9 Drawing Sheets

METHOD OF OPERATING A FUEL CELL SYSTEM BY DETECTING LEAKAGE OF A COMBUSTIBLE GAS

CROSS-REFERENCE TO RELATED APPLICATIONS

This application is a Continuation of U.S. patent application Ser. No. 10/955,516, filed Sep. 30, 2004, and the disclosure of which is incorporated herein by reference.

BACKGROUND OF THE INVENTION

The present invention relates to a fuel cell system employed in, for example, stationary power generation apparatuses, or power supplies for automobile.

In recent years, concern about environmental problems has been increasing on a global scale, under the influence of global warming, acid rain, and so on, due to carbon acid gas. So, in a field of power supply development, attention has been focused on a fuel cell system capable of energy change which is highly efficient and keeps the environment clean without emission of carbon acid gas.

Figure 9:
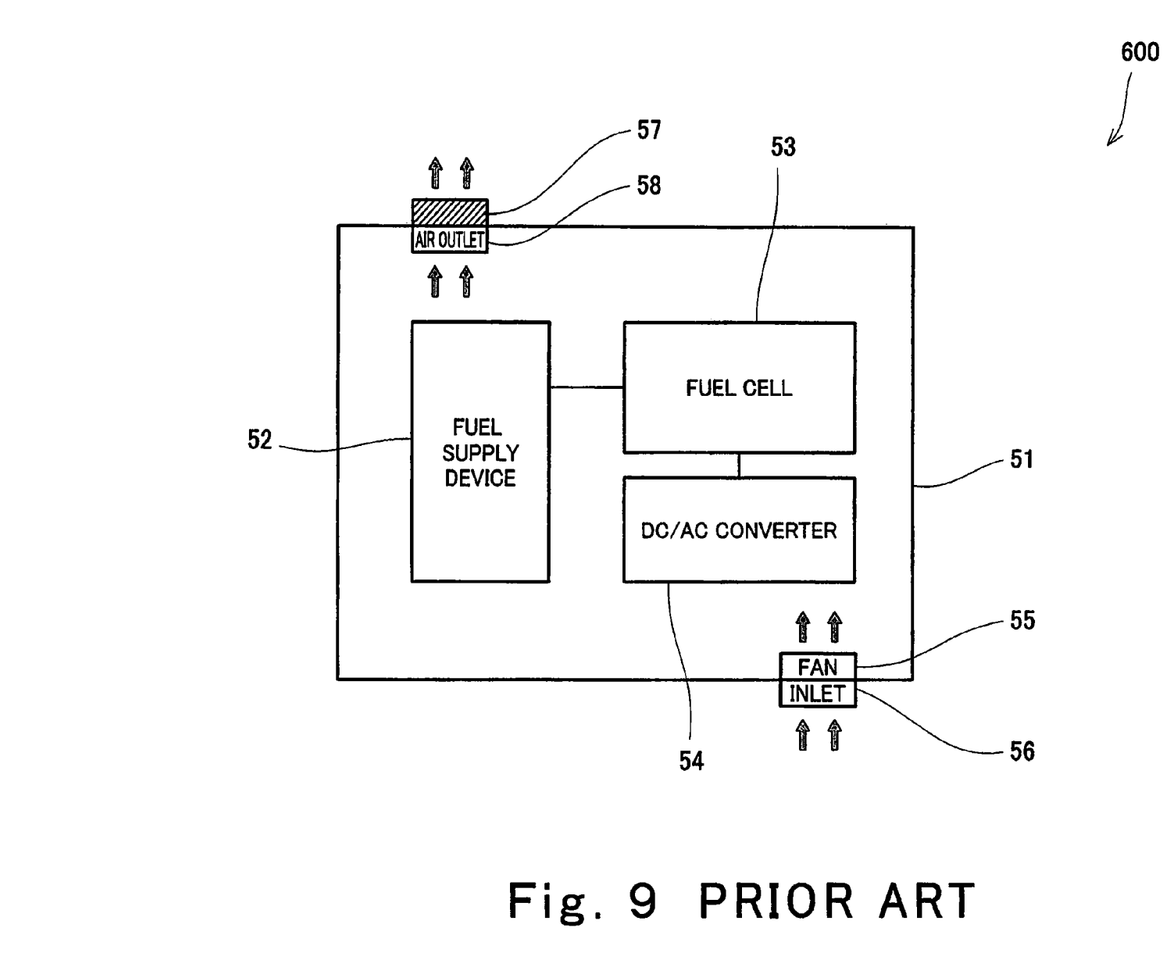
FIG. 9 is a view schematically showing an example of a construction of the conventional fuel cell system.

FIG. 9 is a view schematically showing an example of a construction of the conventional fuel cell system.

Referring now to FIG. 9, a conventional fuel cell system 600 comprises, within a package 51, a fuel supply device 52, a fuel cell 53, and a DC/AC (direct current-to-alternate current) converter 54. The fuel supply device 52 is configured to supply a hydrogen-rich gas containing plentiful hydrogen (hereinafter referred to as hydrogen-rich gas) to the fuel cell 53. The fuel cell 53 is configured to carry out power generation to output a DC (direct current) of a predetermined voltage, using the hydrogen-rich gas supplied from the fuel supply device 52. The DC/AC converter 54 is configured to convert the DC of the predetermined voltage which is output from the fuel cell 53 into an AC of the predetermined voltage, and to output the AC. The package 51 is provided with an inlet 56 to which a fan 55 is attached, and an air outlet 58 to which a combustible gas detector 57 which detects a combustible gas is attached (see Japanese Laid-Open Patent Application Publication No. Hei 03-254070, FIG. 1).

When the fuel cell system 600 is operated to generate an electric power, the fuel supply device 52 first generates the hydrogen-rich gas, and then supplies the hydrogen-rich gas to the fuel cell 53 through a predetermined pipe. The fuel cell 53 generates an electric power using the hydrogen-rich gas supplied from the fuel supply device 52. The DC of the predetermined voltage generated in the fuel cell 53 is input to the DC/AC converter 54. The DC/AC converter 54 converts the DC of the predetermined voltage input from the fuel cell 53 into the AC of the predetermined voltage. Thereby, the AC of the predetermined voltage is output from the fuel cell system 600.

During an operation of the fuel cell system 600, ambient air is suctioned from the inlet 56 into the package 51 by using the fan 55, and the air in the interior of the package 51 is exhausted from the air outlet 58 to outside of the package 51 through the combustible gas detector 57. This is because, if the combustible gas such as the hydrogen-rich gas leaks from the fuel supply device 52 and/or the fuel cell 53, such a leakage combustible gas is exhausted from the air outlet 58 to outside of the package 51, and the combustible gas detector 57 detects the leakage of the combustible gas, so that the operation of the fuel cell system 600 is stopped, and some appropriate actions are taken, for example, information indicating a warning is displayed, in order to avoid dangerous explosion and so on.

In the conventional fuel cell system 600, the combustible gas detector 57 is capable of accurately detecting the leakage of the combustible gas so long as the combustible gas detector 57 is functioning properly. In other words, safety of the fuel cell system 600 can be ensured so long as the combustible gas detector 57 is functioning properly. However, if the detection capability of the combustible gas detector 57 degrades, for example, after an elapse of time, and hence detection sensitivity of the combustible gas detector 57 to the combustible gas degrades, the leakage of the combustible gas cannot be detected accurately. In such a case, safety of the fuel cell system 600 cannot be ensured. Especially when the detection sensitivity of the combustible gas detector 57 to the combustible gas significantly degrades, the combustible gas detector 57 is incapable of detecting even the leakage of the combustible gas with a concentration which exceeds an upper limit of an allowable range. In this case, since safety measures cannot be taken for the fuel cell system 600, it may be highly probable that the fuel system 600 malfunctions, for example.

The safety of the fuel cell system 600 may be ensured by inspecting the combustible gas detector 57 on a regular basis or by forcibly replacing the combustible gas detector 57, assuming that the above-mentioned condition would take place. In that case, however, maintenance such as inspection and replacement of the combustible gas detector 57 must be carried out, irrespective of whether or not the combustible gas detector 57 is functioning properly. This may lead to increased cost in maintenance of the fuel cell system 600.

BRIEF SUMMARY OF THE INVENTION

The present invention has been developed under the circumstances, and an object of the present invention is to provide a fuel cell system capable of ensuring safety associated with leakage of a combustible gas and of reducing a maintenance cost.

In order to achieve the above described object, according to one aspect of the present invention, there is provided a fuel cell system comprising, within a package, a fuel cell stack; a hydrogen-rich gas supply means configured to supply a hydrogen-rich gas; a combustible gas detector configured to detect leakage of a combustible gas which is the hydrogen-rich gas or a raw fuel gas which is a raw material of the hydrogen-rich gas within the package; a combustible gas guide pipe through which the combustible gas is guided into the package; and a controller; wherein the controller is configured to inject the combustible gas intermittently through the combustible gas guide pipe, and to perform a self-diagnostic process as to whether or not the combustible gas detector is functioning properly. In accordance with such a construction, since the fuel cell system is configured to self-diagnose the function of the combustible gas detector based on the gas actually used in the fuel cell system, malfunction or the like of the combustible gas detector can be reliably avoided.

The combustible gas guide pipe may be configured to branch from a combustible gas passage and to have an end positioned in the vicinity of the combustible gas detector, and the controller may be configured to inject the combustible gas intermittently toward the combustible gas detector through the combustible gas guide pipe, and to perform a self-diagnostic process as to whether or not the combustible gas detector is functioning properly. In accordance with such a construction, since the fuel cell system is configured to self-diagnose the function of the combustible gas detector, malfunction or the like of the combustible gas detector can be avoided.

In this case, the hydrogen-rich gas supply means may be a reformer configured to generate the hydrogen-rich gas from the raw fuel gas. In such a construction, it is not necessary to install a device such as a hydrogen tank, which requires replacement, in the fuel cell system.

The combustible gas guide pipe may be configured to branch from a position in a raw fuel gas supply passage connected to an inlet of the reformer. In such a construction, the raw fuel gas can be guided into the combustible gas guide pipe.

The combustible gas guide pipe may be configured to branch from a position in a hydrogen supply passage extending between the reformer and an anode of the fuel cell stack, and the raw fuel gas is used under a stopped state of the reformer and the hydrogen-rich gas is used during an operation of the reformer as a gas injected toward the combustible gas detector. By doing so, the kind of the gas injected toward the combustible gas detector can be selected according to an operating state of the fuel cell system.

The combustible gas guide pipe may be configured to branch from a position in an exhausted hydrogen passage connected to an anode of the fuel cell stack, and the raw fuel gas filled within the fuel cell stack to purge the hydrogen-rich gas when an operation of the fuel cell stack terminates is used as a gas injected toward the combustible gas detector. By doing so, since utilization efficiency of the raw fuel gas is improved, the raw fuel gas can be effectively utilized.

The controller may be configured to close a raw fuel gas valve provided in a raw fuel gas supply passage when said combustible gas detector continues to detect the combustible gas after an elapse of predetermined time after the controller terminates injection of the combustible gas. By doing so, it is possible to inhibit the combustible gas from continuing to flow irrespective of the failure of the valve configured to be opened and closed to control the flow of the combustible gas.

An exhaust fan may be provided in the package in the vicinity of the combustible gas detector, and configured to dilute the injected combustible gas with ambient air and to exhaust the diluted combustible gas to outside of the package. Since the combustible gas injected toward the combustible gas detector is sufficiently diluted with air and then exhausted to outside the package, the combustible gas can be exhausted safely.

The controller may be configured to operate the exhaust fan intermittently during a stopped state of the fuel cell system to allow leakage of the combustible gas to be monitored during the stopped state of the fuel cell system. Since the leakage of the combustible gas can be also monitored under the stopped state of the operation of the fuel cell system, the safety of the fuel cell system can be ensured.

The controller may be configured to perform the self-diagnostic process in such a manner that the controller determines that life of the combustion gas detector has expired when detection sensitivity of the combustible gas detector to the injected combustible gas varies from an initial value and becomes outside an allowable range, and prohibits an operation of the fuel cell system. Since the operation of the fuel cell system is prohibited when the life of the combustible gas detector gas has expired, the safety of the fuel cell system can be ensured.

The controller may further cause a warning to be displayed when determining that the life of the combustible gas detector has expired.

Thereby, since the warning is displayed when the life of the combustible gas detector has expired, the safety of the fuel cell system can be ensured.

The controller may be configured to set an injection interval of the combustible gas longer when a variation in the detection sensitivity of the combustible gas detector from an initial value is smaller than a predetermined value, and to set the injection interval shorter when the variation is larger than the predetermined value. Since the self-diagnostic process is carried out depending on the state of the combustible gas detector, degradation of the function of the combustible gas detector can be accurately recognized.

The controller may be configured to predict the life of the combustible gas detector from the self-diagnostic process, and to communicate information regarding the predicted life to a maintenance operator. By doing so, since the life of the combustible gas detector can be predicted in advance, a cost associated with maintenance can be reduced.

The above and further objects and features of the invention will more fully be apparent from the following detailed description with accompanying drawings.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Hereinafter, preferred embodiments of the present invention will be described with reference to the drawings.

Embodiment 1

Figure 1:
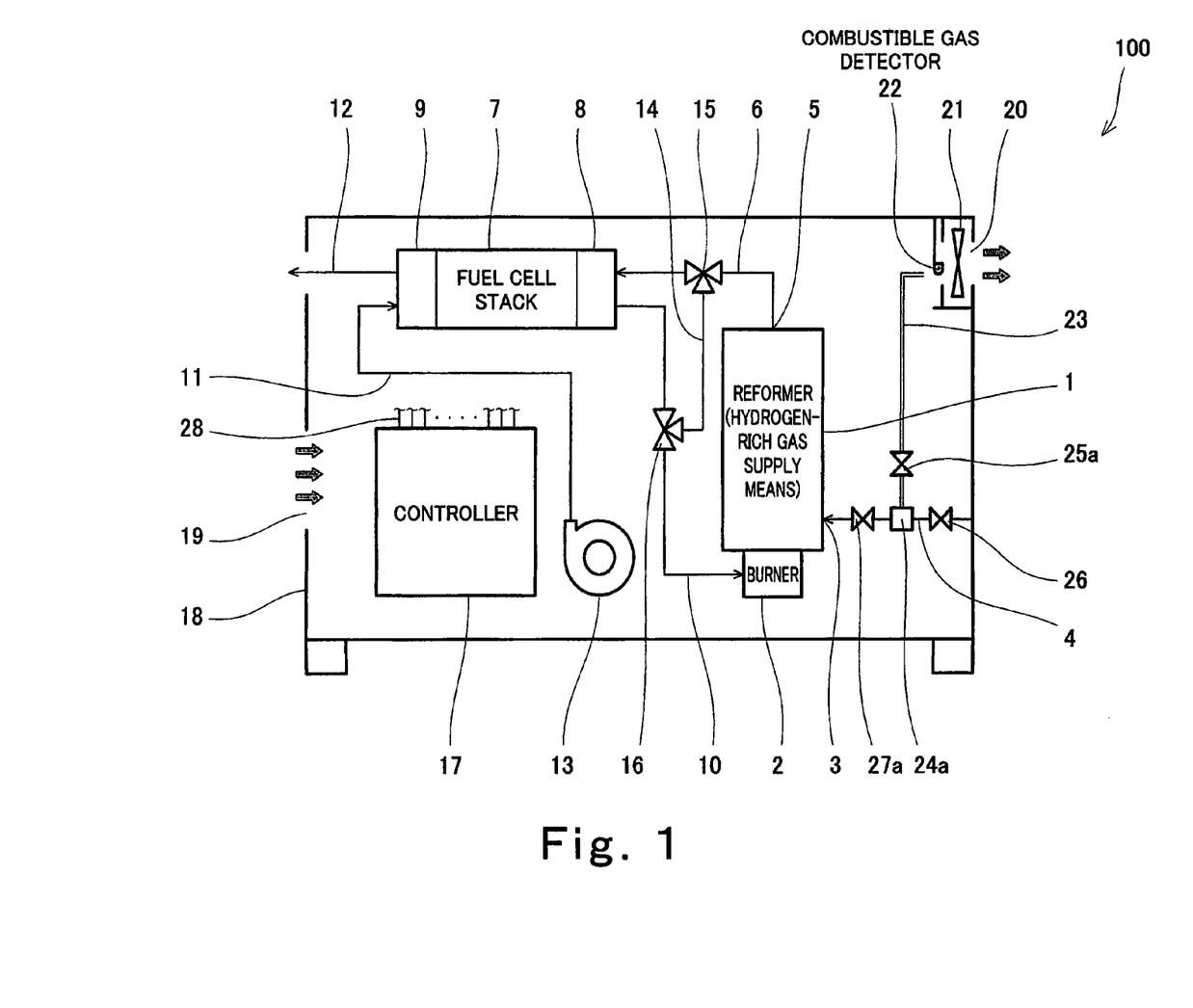
FIG. 1 is a view schematically showing a construction of a fuel cell system according to a first embodiment of the present invention.

FIG. 1 is view schematically showing a construction of a fuel cell system according to a first embodiment of the present invention.

First of all, a construction of a fuel cell system 100 according to the first embodiment of the present invention will be described with reference to the drawings.

Referring now to FIG. 1, the fuel cell system 100 comprises, within a package 18 provided with an inlet 19 and an outlet 20, a reformer 1 equipped with a burner 2 and configured to generate a hydrogen-rich gas, i.e., function as a hydrogen-rich gas supply means, a fuel cell stack 7 including an anode 8 and a cathode 9 and configured to generate an electric power using the hydrogen-rich gas and air, three-way valves 15 and 16 configured to change passages of the hydrogen-rich gas or the like, valves 25a and 27a configured to open and close passages of a raw fuel gas or the like, a raw fuel gas valve 26 configured to open and close a passage of the raw fuel gas, a branch portion 24a at which the passage of the raw fuel gas branches, a combustible gas detector 22 configured to detect a combustible gas, an exhaust fan 21 configured to ventilate the interior of the fuel cell system 100, an air blower 13 configured to supply the air to the fuel cell stack 7, and a controller 17 configured to suitably control operations of these components. As used herein, the term "hydrogen-rich gas" includes pure hydrogen.

A raw fuel gas supply passage 4, which is a combustible gas flow passage, is connected to an inlet 3 of the reformer 1. The raw fuel gas valve 26, the branch portion 24a, and the valve 27a are provided at predetermined positions of the raw fuel gas supply passage 4. A combustible gas guide pipe 23 extends from the branch portion 24a, and the valve 25a is provided at a predetermined position of the combustible gas guide pipe 23. A tip end of the combustible gas guide pipe 23 is positioned in the vicinity of the combustible gas detector 22. The exhaust fan 21 is positioned adjacently to the combustible gas detector 22. The exhaust fan 21 is configured to suction the air within the package 18 and to exhaust the air from the outlet 20. It will be appreciated that the tip end of the combustible gas guide pipe 23 may be located at any position within the package 18 other than the vicinity of the combustible gas detector 22, which enables a self-diagnostic function described later to be performed.

A hydrogen-rich gas supply passage 6 is connected to an outlet 5 of the reformer 1. An end of the hydrogen-rich gas supply passage 6 is connected to the anode 8 of the fuel cell stack 7. An exhausted hydrogen passage 10 extends from the anode 8, and an end of the exhausted hydrogen passage 10 is connected to the burner 2 equipped in the reformer 1. The three-way valves 15 and 16 are provided at predetermined positions of the hydrogen-rich gas supply passage 6 and the exhausted hydrogen passage 10, respectively. The three-way valve 15 is connected to the three-way valve 16 through a bypass 14. And, an air supply passage 11 extends from the air blower 13, and an end of the air supply passage 11 is connected to the cathode 9 of the fuel cell stack 7. An exhausted air passage 12 extends from the cathode 9 to outside of the package 18.

The controller 17 and above the components of the fuel cell system 100 are interconnected through predetermined wires 28 (entire of which are not illustrated in FIG. 1). And, the controller 17 is configured to properly control the components of the fuel cell system 100 by using the predetermined wires 28. Thereby, the fuel cell system 100 operates.

Subsequently, a basic operation of the fuel cell system 100 according to the first embodiment will be described with reference to the drawings.

The raw fuel gas, for example, methane, flows within the raw fuel gas supply passage 4 and into the reformer 1 through the inlet 3. The raw fuel gas within the reformer 1 is heated by the burner 2. Thereby, the raw fuel gas is converted into the hydrogen-rich gas through a predetermined reforming reaction. The hydrogen-rich gas containing plentiful hydrogen (hydrogen-rich gas) is supplied to the anode 8 of the fuel cell stack 7 through the hydrogen-rich gas supply passage 6. Meanwhile, the air from the air blower 13 is supplied to the cathode 9 of the fuel cell stack 7 through the air supply passage 11. Within the fuel cell stack 7, a chemical reaction between hydrogen contained in the hydrogen-rich gas and oxygen contained in air is conducted using the hydrogen-rich gas and the air. Through the chemical reaction between hydrogen and oxygen, a DC of a predetermined voltage is output from the fuel cell stack 7. Excess air, remaining unconsumed after the chemical reaction, is exhausted from the fuel cell stack 7 to outside of the package 18 through the exhausted air passage 12 connected to the cathode 9. And, excess hydrogen-rich gas, remaining unconsumed after the chemical reaction, is supplied to the burner 2 through the exhausted hydrogen passage 10 connected to the anode 8. In the burner 2, the hydrogen-rich gas supplied through the exhausted hydrogen passage 10 is used as a heating fuel of the reforming reaction for generating the hydrogen-rich gas. By the way, in an initial stage of the operation of the fuel cell system 100, sufficient hydrogen required for power generation in the fuel cell stack 7 is not generated in the reformer 1, and the hydrogen-rich gas supplied from the reformer 1 contains catalyst poisoning component such as carbon monoxide. For this reason, in the initial stage of the operation of the fuel cell system 100, the three-way valves 15 and 16 are operated to allow the hydrogen-rich gas supply passage 6 to be connected to the exhausted hydrogen passage 10 through the bypass 14 so that the hydrogen-rich gas containing low-content hydrogen is supplied to the burner 2 rather than the fuel cell stack 7. Also, within the package 18, air flow is caused to occur in a way that ambient air is suctioned from the inlet 19 and exhausted from the outlet 20 by using the exhaust fan 21. By doing do, if the combustible gas such as the raw fuel gas or the hydrogen-rich gas containing hydrogen leaks from the reformer 1, the fuel cell stack 7 or the like, this combustible gas is exhausted from the outlet 20 immediately to outside the package 18 by using the exhaust fan 21. Also, when the combustible gas detector 22 equipped in the vicinity of the exhaust fan 21 detects abnormality regarding leakage of the combustible gas, the controller 17 closes the raw fuel gas valve 26 to cause the fuel cell system 100 to stop operation. Further, the controller 17 causes a warning to be displayed and so on as desired so that information indicating abnormality may be presented to a user of the fuel cell system 100.

Subsequently, a self-diagnostic process regarding a function of the combustible gas detector 22 in the fuel cell system 100 according to the first embodiment of the present invention will be described with reference to the drawings.

Figure 2:
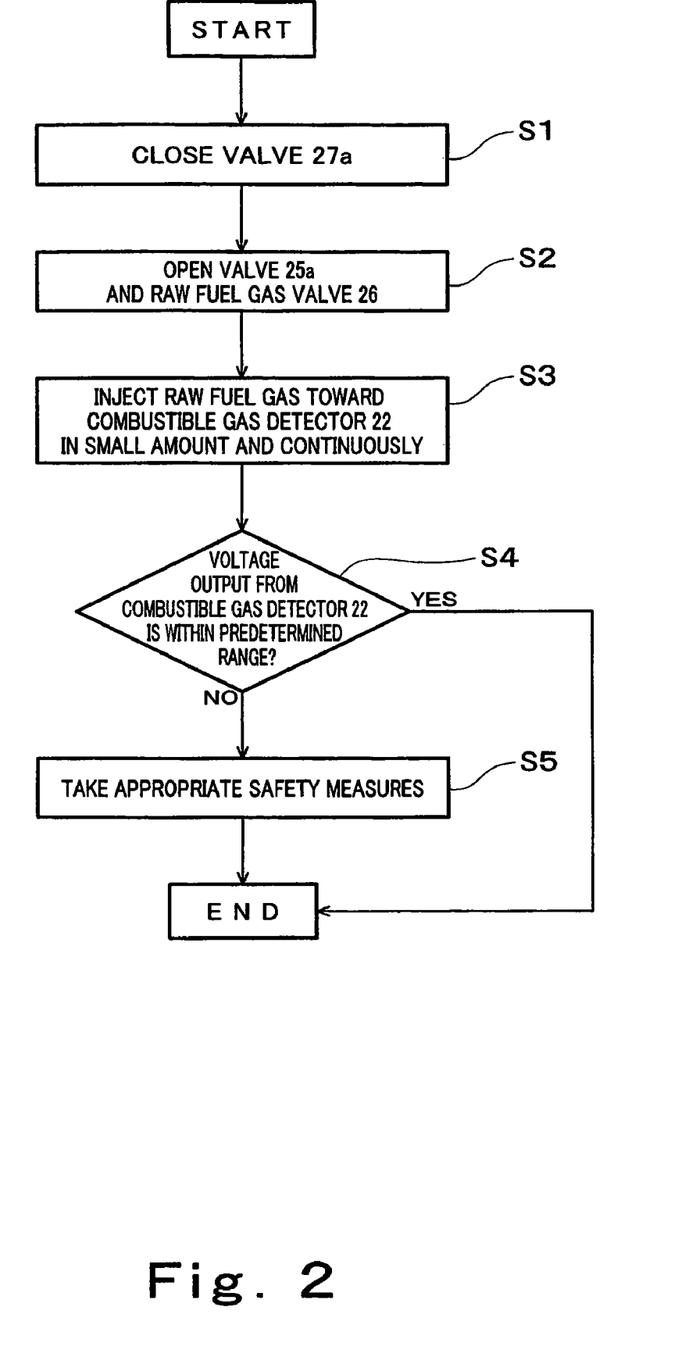
FIG. 2 is a flowchart showing self-diagnostic steps for a combustible gas detector according to the first embodiment of the present invention.

FIG. 2 is a flowchart showing self-diagnostic steps for the combustible gas detector 22 of the first embodiment of the present invention.

When the fuel cell system 100 carries out a self-diagnostic process regarding the function of the combustible gas detector 22, the controller 17 closes the valve 27a (Step S1) and opens the raw fuel gas valve 26 and the valve 25a (Step S2), under a stopped state of power generation, for example. Under this condition, the controller 17 injects the raw fuel gas, which is a combustible gas, for example, methane, from the tip end of the combustible gas guide pipe 23 toward the combustible gas detector 22 in a little amount and continuously (Step S3). At this time, if the combustible gas detector 22 outputs a voltage corresponding to a combustible gas concentration within a predetermined range to the controller 17, the controller 17 determines that the combustible gas detector 22 is functioning properly, and terminates the self-diagnostic process (YES in Step S4). On the other hand, when the combustible gas detector 22 has degraded after an elapse of time and thereby detection sensitivity of the combustible gas detector 22 to the combustible gas is low, the output voltage of the combustible gas detector 22 becomes not higher than a voltage corresponding to combustible gas concentration within the predetermined range, although the fuel gas is injected toward the combustible gas detector 22 as described above (NO in Step S4). From this, the controller 17 recognizes that the combustible gas detector 22 is not functioning properly. When the output voltage of the combustible gas detector 22 is outside the predetermined allowable range, the controller 17 determines that the life of the combustible gas detector 22 has expired, and takes appropriate safety measures for ensuring safety of the fuel cell system 100, for example, by displaying information regarding prohibition of the operation of the fuel cell system 100, a warning, etc (Step S5).

The series of self-diagnostic process in the fuel cell system 100 may be carried out during a power generation operation, as well as during the stopped state of the power generation operation. In that case, the controller 17 opens the valve 25a, the raw fuel gas valve 26, and the valve 27a in Step S2. Under this condition, the raw fuel gas is supplied to the reformer 1 and the hydrogen-rich gas generated in the reformer 1 is supplied to the fuel cell stack 7. Thereby, the fuel cell stack 7 carries out power generation to output the DC of the predetermined voltage. And, when the controller 17 recognizes that the output voltage of the combustible gas detector 22 becomes not higher than the voltage corresponding to the combustible gas concentration within the predetermined range (NO in Step S4), the controller 17 takes appropriate measures for ensuring safety of the fuel cell system 100 by displaying a warning, etc, and by closing the valve 26 (Step S5).

It may be considered that the safety of the fuel cell system 100 can be satisfactorily ensured without continuously carrying out the self-diagnostic process (i.e., injection of the combustible gas toward the combustible gas detector 22 in Step S3). In other words, the safety of the fuel cell system 100 can be ensured by carrying out the self-diagnostic process intermittently, for example, once every other day or every several days. Nonetheless, if the variation in the output voltage of the combustible gas detector 22 during the self-diagnostic process increases, the controller 17 determines that the life of the combustible gas detector 22 will expire soon, and decreases a time interval at which the combustible gas is injected toward the combustible gas detector 22, thus effectively ensuring the safety of the fuel cell system 100.

In the self-diagnostic process of the fuel cell system 100, the combustible gas such as methane is injected within the package 18 although the amount is small (Step S3). So, it is necessary to exhaust the combustible gas to outside of the package 18 after diluting the injected combustible gas by mixing with ambient air by using the exhaust fan 21 so that the concentration of the combustible gas becomes not higher than a lower limit at which explosion may take place. By doing so, the safety of the fuel cell system 100 can be ensured.

Also, consideration should be given to a case where the passage cannot be closed by the valve 25a due to its failure during injection of the combustible gas in the self-diagnostic process in the fuel cell system 100. In this case, if the combustible gas detector 22 continues to detect the combustible gas even after an elapse of predetermined time after the controller 17 outputs a signal to terminate the injection of the combustible gas, the controller 17 outputs a signal to close the raw fuel gas valve 26. Since the controller 17 closes the raw fuel gas valve 26 even when the valve 25a cannot close the passage due to its failure, the safety of the fuel cell system 100 can be ensured.

Further, the controller 17 may operate the exhaust fan 21 intermittently during the stopped state of power generation operation to monitor the leakage of the combustible gas all the time. This is very effective in ensuring the safety of the fuel cell system 100.

In the self-diagnostic process of the fuel cell system 100, the controller 17 may communicate the information regarding the combustible gas concentration, output from the combustible gas detector 22, to a maintenance operator or the like so that the maintenance operator or the like can predict the life of the combustible gas detector 22. By doing so, appropriate measures can be taken, for example, the combustible gas detector 22 is replaced, before the life of the combustible gas detector 22 expires and thereby the fuel cell system 100 fails or stops.

As should be appreciated from the foregoing, in accordance with the first embodiment, even when the detection sensitivity of the combustible gas detector 22 to the combustible gas degrades after an elapse of time, the safety of the fuel cell system 100 can be ensured by carrying out the self-diagnostic process involving detecting the life of the combustible gas detector 22, and by taking appropriate measures. In addition, unnecessary maintenance such as inspection and replacement of the combustible gas detector 22 for ensuring the safety of the fuel cell system 100 need not be carried out. Consequently, maintenance cost can be reduced compared to the conventional fuel cell system.

Embodiment 2

Figure 3:
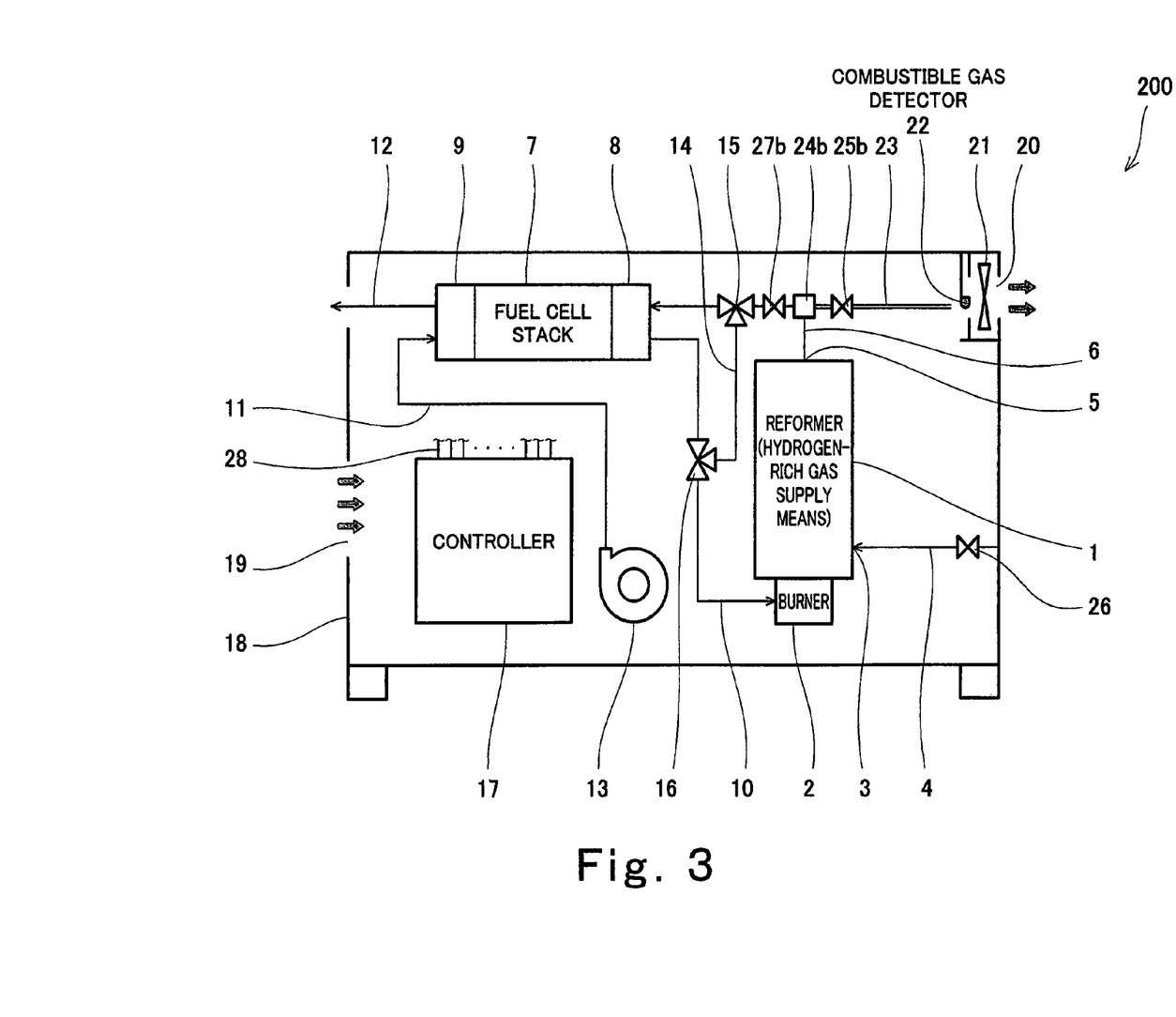
FIG. 3 is a view schematically showing a construction of a fuel cell system according to a second embodiment of the present invention.

FIG. 3 is a view schematically showing a construction of a fuel cell system according to a second embodiment of the present invention. In FIG. 2, the same reference numerals as those in FIG. 1 of the first embodiment denote the same or corresponding parts, which will not be further described.

In the second embodiment, a branch portion 24b and a valve 27b are provided at predetermined positions of the hydrogen-rich gas supply passage 6 connecting the reformer 1 to the anode 8 of the fuel cell stack 7. The combustible gas guide pipe 23 extends from the branch portion 24b. A valve 25b is provided at a predetermined position of the combustible gas guide pipe 23. Only the raw fuel gas valve 26 is provided at a predetermined position of the raw fuel gas supply passage 4. In other construction, the second embodiment is substantially identical to the first embodiment.

A self-diagnostic process regarding a function of the combustible gas detector 22 in the fuel cell system 200 of the second embodiment will be described with reference to the drawings.

Figure 4:
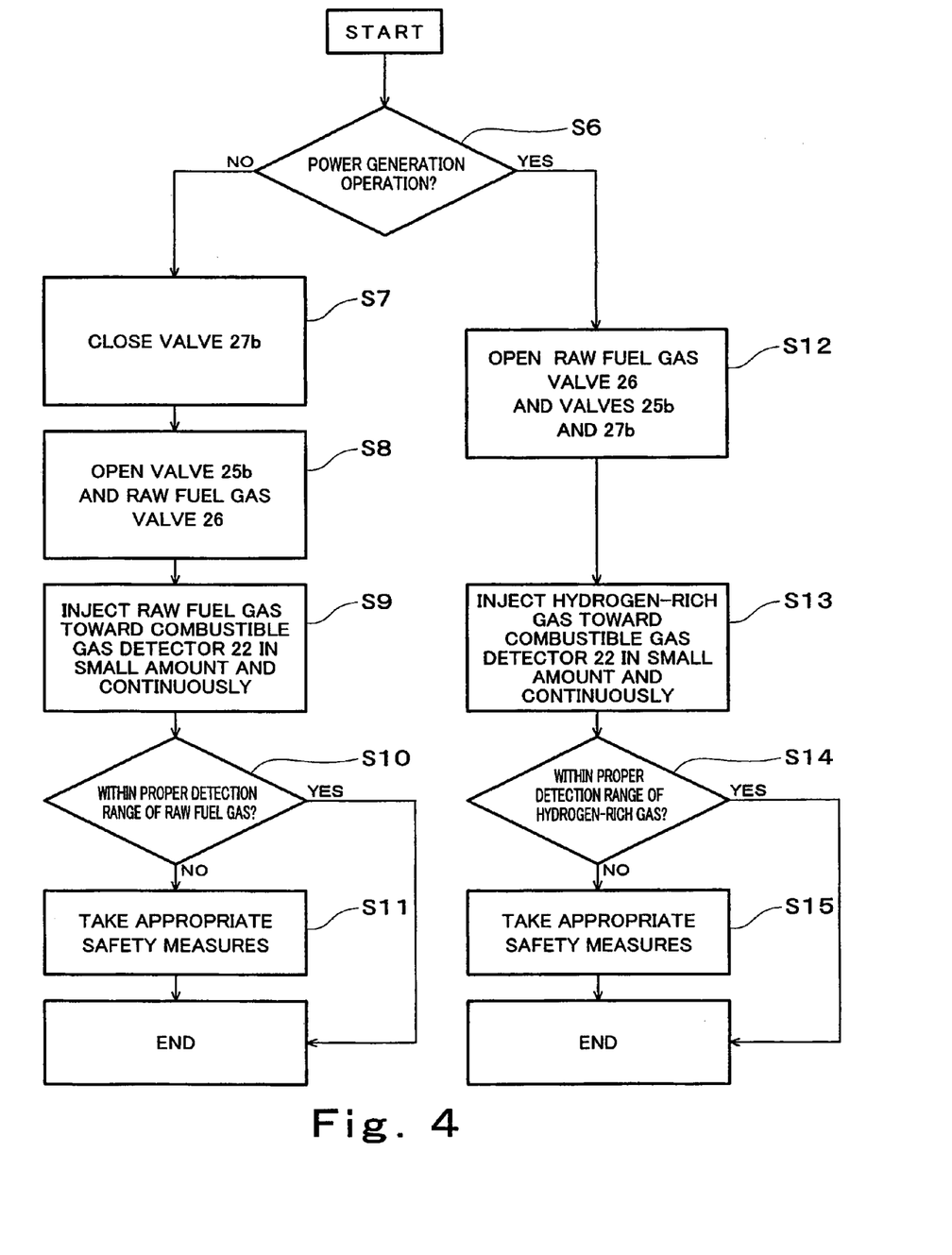
FIG. 4 is a flowchart showing self-diagnostic steps for a combustible gas detector according to the second embodiment of the present invention.

FIG. 4 is a flowchart showing self-diagnostic steps for the combustible gas detector 22 according to the second embodiment of the present invention.

In the second embodiment, when performing self-diagnostic process as to whether or not the combustible gas detector 22 is functioning properly after determining that the power generation operation is in the stopped state (NO in Step S6), the controller 17 closes the valve 27b (Step S7), and opens the valve 25b and the raw fuel gas valve 26 (Step S8). And, the controller 17 injects the raw fuel gas that has flowed through the reformer 1 in small amount toward the combustible gas detector 22 through the combustible gas guide pipe 23 (Step S9). If the combustible gas detector 22 outputs a voltage within a proper detection range of the raw fuel gas to the controller 17, the controller 17 determines that the combustible gas detector 22 is functioning properly, and terminates the self-diagnostic process (YES in Step S10). On the other hand, if the combustible gas detector 22 has degraded after an elapse of time and the detection sensitivity of the combustible gas detector 22 to the raw fuel gas is low, the output voltage of the combustible gas detector 22 becomes not higher than the voltage within the proper detection range although the raw fuel gas is injected toward the combustible gas detector 22 (NO in Step S10). From this, the controller 17 recognizes that the combustible gas detector 22 is not functioning properly. And, the controller 17 determines that the life of the combustible gas detector 22 has expired, and takes appropriate safety measures for ensuring safety of the fuel cell system 200, for example, by displaying information regarding prohibition of the operation of the fuel cell system 200, displaying a warning, etc (Step S11).

On the other hand, when performing the self-diagnostic process after determining that the fuel cell system 200 is carrying out the power generation operation (YES in Step S6), the controller 17 opens the raw fuel gas valve 26, the valves 25b and 27b (Step S12). Under this condition, the controller 17 injects the hydrogen-rich gas which is the combustible gas, in small amount toward the combustible gas detector 22 (Step S13) while supplying the hydrogen-rich gas to the fuel cell stack 7. If the combustible gas detector 22 outputs a voltage within a proper detection range of the hydrogen-rich gas to the controller 17, the controller 17 determines that the combustible gas detector 22 is functioning properly, and terminates self-diagnostic process (YES in Step S14). On the other hand, when the combustible gas detector 22 has degraded after an elapse of time and thereby detection sensitivity of the combustible gas detector 22 to the hydrogen-rich gas is low, the output voltage of the combustible gas detector 22 becomes not higher than the voltage within the proper detection range, although the hydrogen-rich gas is injected toward the combustible gas detector 22 (NO in Step S14). At this time, the controller 17 also recognizes that the combustible gas detector 22 is not functioning properly. And, the controller 17 determines that the life of the combustible gas detector 22 has expired, and takes appropriate safety measures for ensuring safety of the fuel cell system 200, for example, by displaying information regarding prohibition of the operation of the fuel cell system 200, displaying a warning, etc (Step S15).

Thus, in the fuel cell system 200 of the second embodiment, the raw fuel gas is injected toward the combustible gas detector 22 during the stopped state of the power generation operation of the fuel cell system 200, while the hydrogen-rich gas is injected toward the combustible gas detector 22 during the power generation operation. And, as shown in the Step S6 in FIG. 4, the kind of the gas injected toward the combustible gas detector 22, i.e., whether the fuel gas or the hydrogen-rich gas is injected toward the combustible gas detector 22, is determined based on whether or not the fuel cell system 200 is carrying out the power generation operation. This is because the hydrogen-rich gas is not generated in the reformer 1 in an initial state of an operation of the reformer 1.

Generally, the combustible gas detector 22 responds to any kind of combustible gases. But, its detection sensitivity, i.e., the detection output voltage with respect to a predetermined gas concentration varies according to a component (kind) of gases. Accordingly, in order to accurately detect time-lapse degradation of the combustible gas detector 22, it is necessary to perform the self-diagnostic process for each of kinds of the combustible gases used in the fuel cell system 200. Accordingly, in the second embodiment, the self-diagnostic process is carried out using the raw fuel gas before the reforming reaction and the hydrogen-rich gas after the reforming reaction, which may leak into the interior of the package 18, and it is thus possible to detect degradation of the detection sensitivity of the combustible gas detector 22 to the leakage of these gases, which may occur after an elapse of time. In this case, since the range of the voltage output from the combustible gas detector 22 varies according to the kind (component) of the injected gases, the range of the output voltage is changed according to the kind (component) of the injected gases for the purpose of proper determination. By doing so, the safety of the fuel cell system 200 can be reliably ensured.

Embodiment 3

Figure 5:
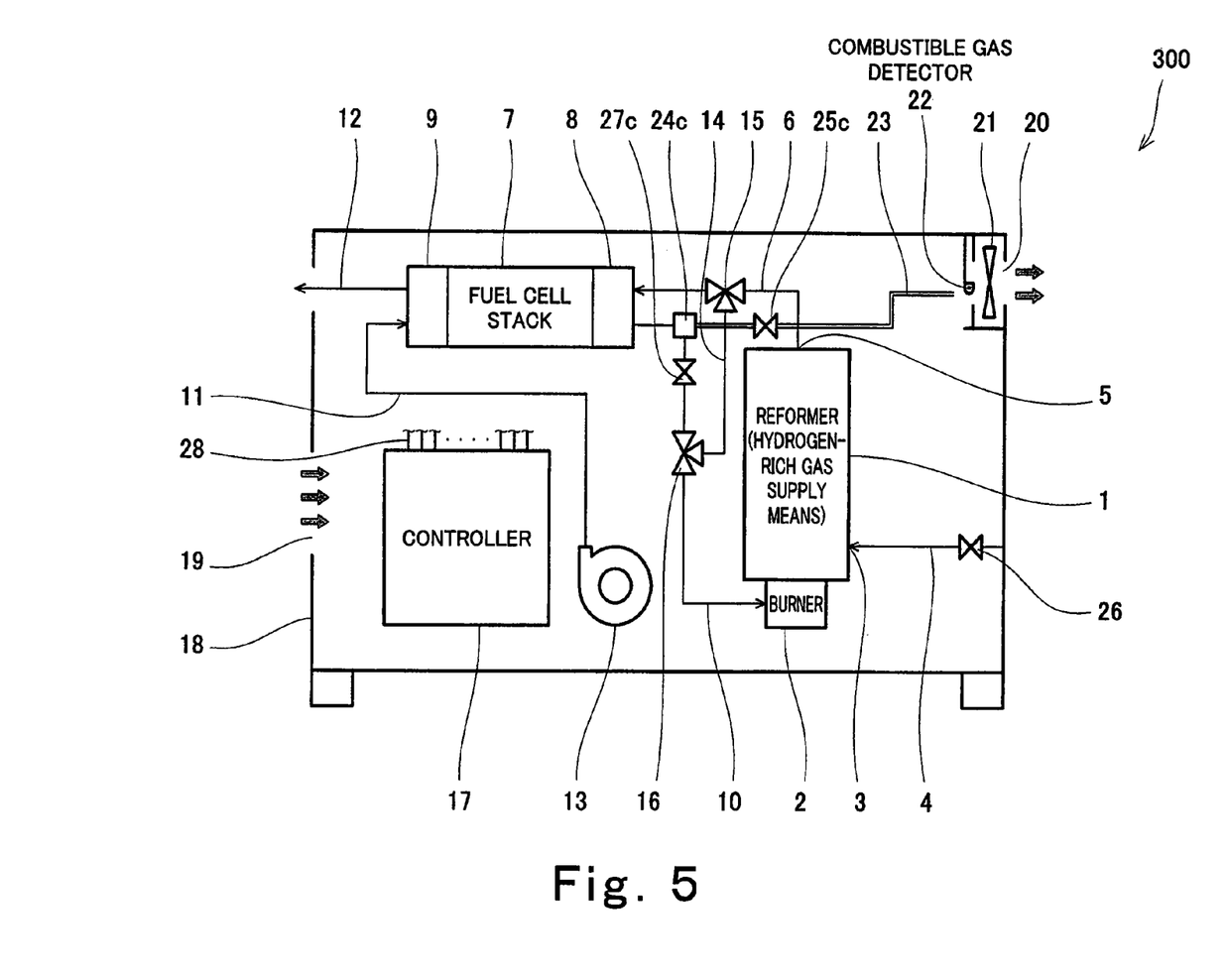
FIG. 5 is a view schematically showing a construction of a fuel cell system according to a third embodiment of the present invention.

FIG. 5 is a view schematically showing a construction of a fuel cell system according to a third embodiment of the present invention. In FIG. 5, the same reference numerals as those in FIG. 1 of the first embodiment denote the same or corresponding parts, which will not be further described.

In a fuel cell system 300 of the third embodiment, a branch portion 24c and a valve 27c are provided at predetermined positions of the exhausted hydrogen passage 10 connecting the anode 8 of the fuel cell stack 7 to the burner 2. The combustible gas guide pipe 23 extends from the branch portion 24c. A valve 25c is provided at a predetermined position of the combustible gas guide pipe 23. Only the raw fuel gas valve 26 is provided at a predetermined position of the raw fuel gas supply passage 4. In other respects, the third embodiment is substantially identical to the first embodiment.

A self-diagnostic process regarding a function of the combustible gas detector 22 in the fuel cell system 300 of the third embodiment will be described with reference to the drawings.

Figure 6:
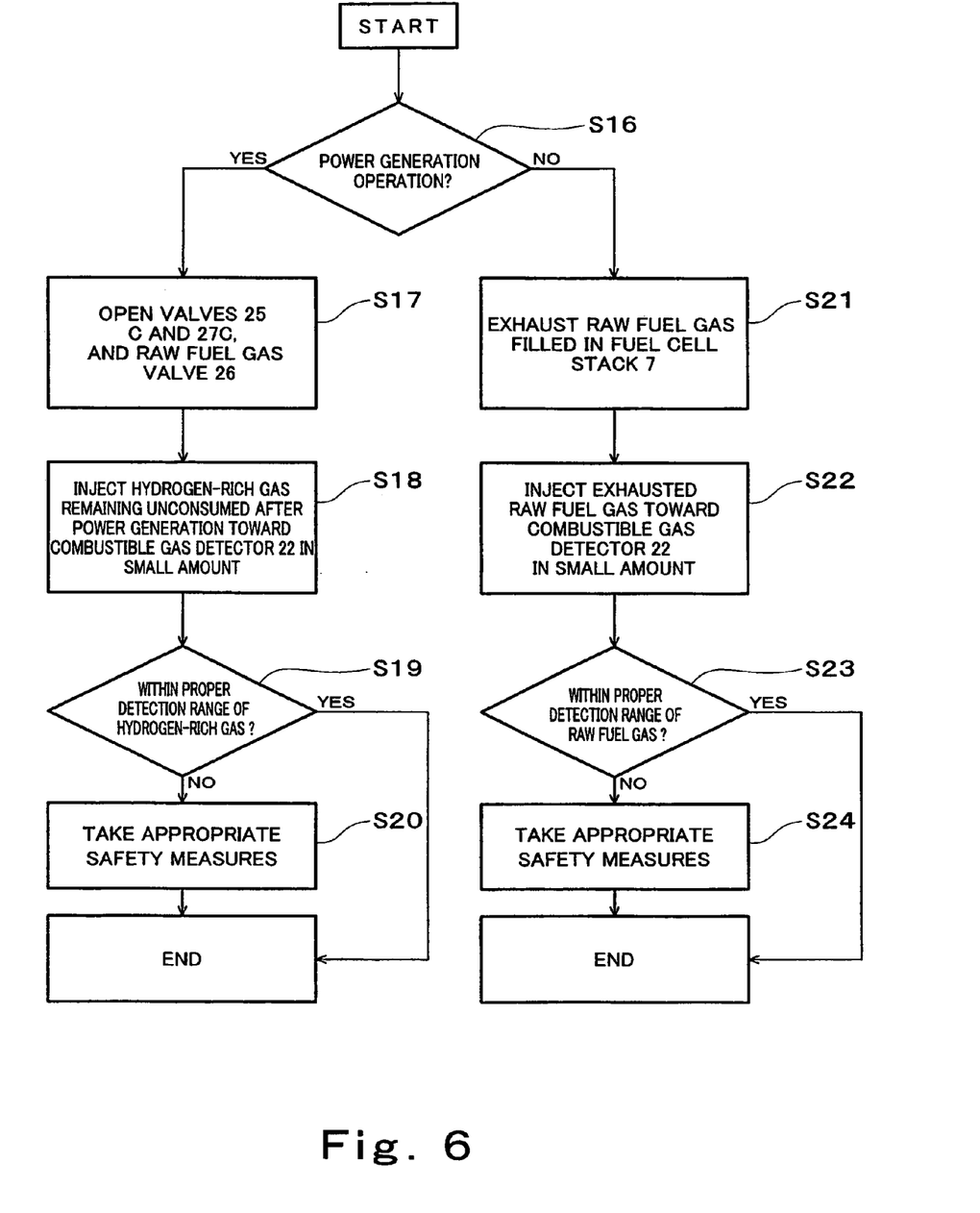
FIG. 6 is a flowchart showing self-diagnostic steps for a combustible gas detector according to the third embodiment of the present invention.

FIG. 6 is a flowchart showing self-diagnostic steps for the combustible gas detector 22 according to the third embodiment of the present invention.

In the third embodiment, when performing the self-diagnostic process as to whether or not the combustible gas detector 22 is functioning properly after determining that the fuel cell system 300 is carrying out the power generation operation (YES in Step S16), the controller 17 opens the valve 27c, the valve 25c and the raw fuel gas valve 26 (Step S17). And, the controller 17 injects the hydrogen-rich gas that has flowed through the anode 8 of the fuel cell stack 7, i.e., the hydrogen-rich gas remaining unconsumed after a power generation reaction in the fuel cell stack 7, in small amount toward the combustible gas detector 22 through the combustible gas guide pipe 23 (Step S18). As in the second embodiment, if the combustible gas detector 22 outputs a voltage within a proper detection range of the hydrogen-rich gas to the controller 17, the controller 17 determines that the combustible gas detector 22 is functioning properly, and terminates the self-diagnostic process (YES in Step S19). On the other hand, if the combustible gas detector 22 has degraded after an elapse of time and the detection sensitivity of the combustible gas detector 22 to the hydrogen-rich gas is low, the output voltage of the combustible gas detector 22 becomes not higher than the voltage within the proper detection range although the hydrogen-rich gas is injected toward the combustible gas detector 22 (NO in Step S19). From this, the controller 17 recognizes that the combustible gas detector 22 is not functioning properly. And, the controller 17 determines that the life of the combustible gas detector 22 has expired, and takes appropriate safety measures for ensuring safety of the fuel cell system 300, for example, by displaying information regarding prohibition of the operation of the fuel cell system 300, a warning, etc (Step S20).

By the way, when the operation of the fuel cell system 300 is terminated, the hydrogen-rich gas remaining within the passages of the reformer 1, the fuel cell stack 7 and so on is purged therefrom by using nitrogen or the like for the purpose of safety. When the fuel cell system is used at home or the like, an alternative gas such as the raw fuel gas is used as a purge gas instead of nitrogen, because it is difficult to supply nitrogen. In the third embodiment, when performing the self-diagnostic process as to whether or not the combustible gas detector 22 is functioning properly after determining that the power generation operation is in the stopped state (NO in Step S16), first, the controller 17 exhausts the raw fuel gas filled within the fuel cell stack 7 therefrom (Step S21). Then, the controller 17 injects the exhausted raw fuel gas in small amount toward the combustible gas detector 22 through the combustible gas guide pipe 23 (Step S22). In other words, the self-diagnostic process regarding the function of the combustible gas detector 22 is performed using the raw fuel gas which is a combustible gas. In this case, as in the second embodiment, if the combustible gas detector 22 outputs a voltage within a proper detection range of the raw fuel gas to the controller 17, the controller 17 determines that the combustible gas detector 22 is functioning properly, and terminates the self-diagnostic process (YES in Step S23). On the other hand, if the combustible gas detector 22 has degraded after an elapse of time and the detection sensitivity of the combustible gas detector 22 to the raw fuel gas is low, the output voltage of the combustible gas detector 22 becomes not higher than the voltage within the proper detection range although the raw fuel gas is injected toward the combustible gas detector 22 (NO in Step S23). From this, the controller 17 recognizes that the combustible gas detector 22 is not functioning properly. And, the controller 17 determines that the life of the combustible gas detector 22 has expired, and takes appropriate safety measures for ensuring safety of the fuel cell system 300, for example, by displaying information regarding prohibition of the operation of the fuel cell system 300, a warning, etc (Step S24).

Thus, in accordance with the third embodiment, since self-diagnostic process regarding the function of the combustible gas detector 22 is carried out using the hydrogen-rich gas remaining unconsumed after the power generation reaction in the fuel cell stack 7 or the raw fuel gas filled in the fuel cell stack 7 to purge the hydrogen-rich gas, the total exhaust amount of the combustible gas such as the hydrogen-rich gas, the raw fuel gas, and the like can be reduced. Also, in accordance with the third embodiment, the safety of the fuel cell system 300 can be reliably ensured.

Embodiment 4

In the above described first to third embodiments, the reformer is used as a device configured to generate and supply the hydrogen-rich gas, and the hydrogen-rich gas is supplied to the fuel cell stack 7. Alternatively, the reformer may be replaced by a hydrogen tank which supplies pure hydrogen to the fuel cell stack 7. In a fourth embodiment, as described below, the hydrogen tank is used instead of the reformer.

In the fourth embodiment, a construction in which the hydrogen tank is equipped within the package of the fuel cell system and a construction in which the hydrogen tank is equipped outside of the package of the fuel cell system will be described.

First, the construction of the fuel cell system in which the hydrogen tank is equipped within the package will be described.

Figure 7:
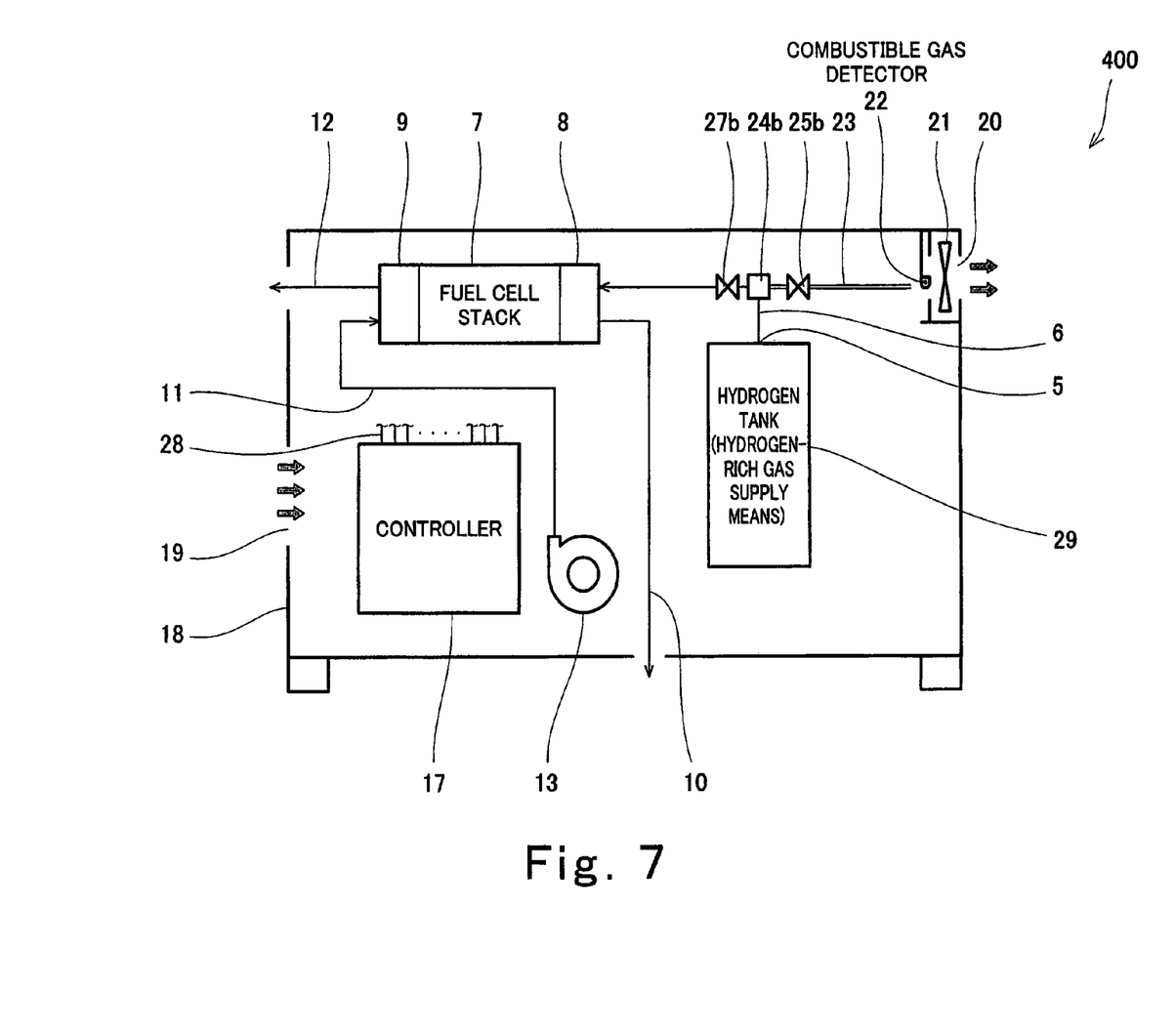
FIG. 7 is a view schematically showing a construction of a fuel cell system according to a fourth embodiment of the present invention.

FIG. 7 is a view schematically showing a construction of the fuel cell system equipped with the hydrogen tank within the package according to the fourth embodiment of the present invention. In FIG. 7, the same reference numerals as those in FIG. 1 of the first embodiment denote the same or corresponding parts, which will not be further described.

Referring now to FIG. 7, a fuel cell system 400 according to the fourth embodiment comprises, within the package 18, a hydrogen tank 29 which is a hydrogen-rich gas supply means. The hydrogen tank 29 is filled with, for example, compressed hydrogen. And, one end of the hydrogen-rich gas supply passage 6 is connected to an exit 5 of the hydrogen tank 29, and the other end thereof is connected to the anode 8 of the fuel cell stack 7. The branch portion 24b and the valve 27b are provided at predetermined positions of the hydrogen-rich gas supply passage 6. The combustible gas guide pipe 23 is connected to the branch portion 24b. The valve 25b is provided at a predetermined position of the combustible gas guide pipe 23. Since the hydrogen tank 29 is used as the hydrogen-rich gas supply means in the fourth embodiment, components used to supply the raw fuel gas, for example, the raw fuel gas supply passage 4, the raw fuel gas valve 26, the branch portion 24a, the valve 27a, and so on, are omitted. In addition, the burner 2 of the first to third embodiments is omitted. Because of the absence of the burner 2, the hydrogen-rich gas remaining unconsumed after the power generation reaction in the fuel cell stack 7, is exhausted from the fuel cell stack 7 to outside of the fuel cell system 400 through, for example, the exhausted hydrogen passage 10. Further, since pure hydrogen is supplied to the fuel cell stack 7 in the fourth embodiment, the three-way valves 15 and 16, and the bypass 14 are omitted. In other respects, the fourth embodiment is substantially identical to the second embodiment.

Subsequently, the construction of the fuel cell system equipped with the hydrogen tank outside of the package will be described.

Figure 8:
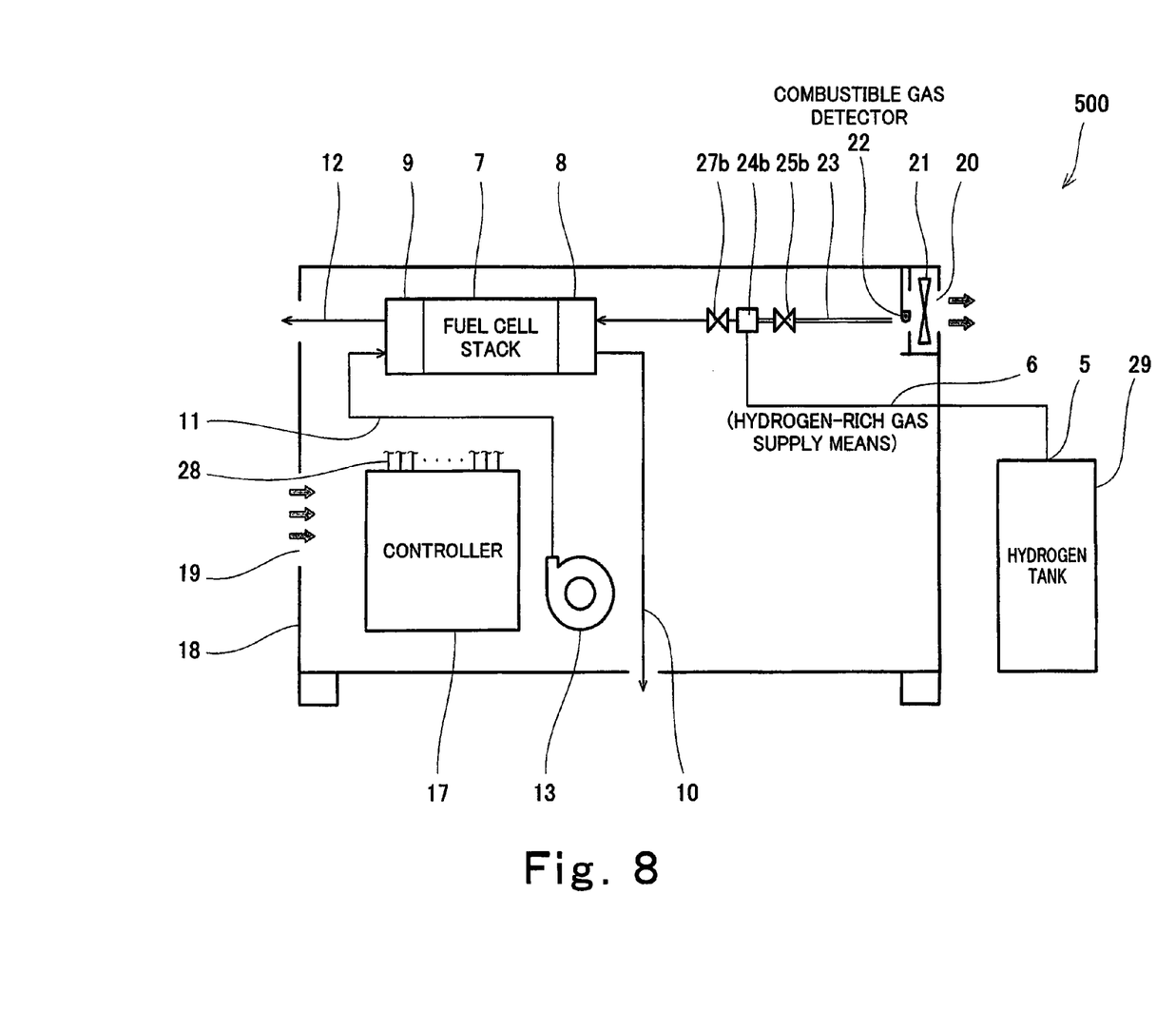
FIG. 8 is a view schematically showing another construction of the fuel cell system according to the fourth embodiment of the present invention.

FIG. 8 is a view schematically showing a construction of a fuel cell system equipped with the hydrogen tank outside of the package according to the fourth embodiment of the present invention. In FIG. 8, the same reference numerals as those in FIG. 1 of the first embodiment denote the same or the corresponding parts, which will not be further described.

Referring to FIG. 8, the fuel cell system 500 of the fourth embodiment is not equipped with the hydrogen tank 29 as the hydrogen-rich gas supply means. Instead, the hydrogen tank 29 is provided outside of the package 18 of the fuel cell system 500. And, the hydrogen tank 29 is connected to the branch portion 24b of the fuel cell system 500 through the extended hydrogen-rich gas supply passage 6. In the fourth embodiment, the hydrogen-rich gas supply passage 6 serves as the hydrogen-rich supply means in the fuel cell system 500. In other respects, the fuel cell system 500 is identical to the fuel cell system 400 of the fourth embodiment.

In the fuel cell systems 400 and 500 so constructed, self-diagnostic process regarding the function of the combustible gas detector 22 is carried out using the pure hydrogen supplied from the hydrogen tank 29. Specifically, the valves 25b and 27b are suitably operated so that the pure hydrogen supplied from the hydrogen tank 29 is injected in small amount toward the combustible gas detector 22 through the combustible gas guide pipe 23. In this manner, the function of the combustible gas detector 22 is self-diagnosed. In the fourth embodiment, the safety of the fuel cell systems 400 and 500 can be reliably ensured as in the first to third embodiments.

As should be appreciated from the foregoing, in accordance with the present invention, since the fuel cell systems 100 to 500 carries out the self-diagnostic process regarding the detecting function of the combustible gas of the combustible gas detector 22, it is possible to avoid malfunction or the like of the combustible gas detector 22. In particular, in accordance with the present invention, since the function of the combustible gas detector 22 is self-diagnosed using the pure hydrogen, the hydrogen-rich gas or the raw fuel gas of the hydrogen-rich gas actually used in the fuel cell systems 100 to 500, rather than combustible gases which are not actually used in the fuel cell systems 100 to 500 (e.g., simulated gases of the pure hydrogen, the hydrogen-rich gas or the raw fuel gas of the hydrogen-rich gas for use in power generation in the fuel cell systems 100 to 500, or other inspection gases for use in self-diagnosis), the self-diagnostic process regarding the function of the combustible gas detector 22 can be carried out accurately and reliably. In other words, the self-diagnostic process regarding the function of the combustible gas detector 22 can be ideally carried out. With such a configuration, the safety of the fuel cell systems 100 to 500 can be reliably ensured.

While the fuel cell systems have been thus far described in the first to fourth embodiments, the present invention is, as a matter of course, applicable to systems equipped with combustible gas detectors within packages thereof, as well as the above-described fuel cell systems. In such systems, the effects provided by the present invention are also obtained.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method of operating a fuel cell system, the method comprising the steps of:
   a) detecting, using a combustible gas detector, leakage of a combustible gas which is a hydrogen-rich gas or a raw fuel gas within a package accommodating a fuel cell stack and a hydrogen-rich gas supplier configured to supply hydrogen-rich gas;
   b) injecting the combustible gas intermittently into the package through a combustible gas guide pipe; and
   c) determining whether or not detection sensitivity of the combustible gas is proper based on an output value of the combustible gas detector when step b) is preformed, wherein:
   the hydrogen-rich gas supplier is a reformer configured to generate the hydrogen-rich gas from raw fuel gas; and
   step b) further includes the step of injecting the raw fuel gas under a stopped state of the reformer and the hydrogen-rich gas during an operation of the reformer as a gas injected toward the combustible gas detector through the combustible gas guide pipe configured to branch from a position in a hydrogen supply passage extending between the reformer and an anode of the fuel cell stack.

2. The method according to claim 1, further comprising the step of prohibiting operation of the fuel cell system when it is determined that the detection sensitivity of the combustible gas detector at the injection of the combustible gas is not proper in step c).

3. The method according to claim 1, further comprising the step of displaying a warning when it is determined that the detection sensitivity of the combustible gas detector at the injection of the combustible gas is not proper in step c).

4. The method according to claim 1, wherein in step b) an injection interval of the combustible gas is set longer when a variation in the detection sensitivity of the combustible gas detector from an initial value is smaller than a set value and the injection interval is set shorter when the variation is larger than the set value.

5. The method according to claim 1, further comprising the step of predicting a life of the combustible gas detector and communicating predicted information to a maintenance operator as a result of self diagnosis in step c).

6. The method according to claim 1, further comprising the step of determining whether or not detection sensitivity of the combustible gas is proper based on whether or not a detection value of the combustible gas detector at the injection of the combustible gas in step b) is within a proper range.

7. The method according to claim 1, further comprising the step of:
   h) determining whether or not a life of the combustible gas detector has expired based on a detection value of the combustible gas detector at the injection of the combustible gas in step b).

8. The method according to claim 7, further comprising the step of displaying information for prohibiting an operation of the fuel cell system when it is determined that the life of the combustible gas detector has expired in step h).

9. The method according to claim 7, further comprising the step of displaying a warning when it is determined that the life of the combustible gas detector has expired in step h).

* * * * *